United States Patent
Cheng

(10) Patent No.: US 7,433,663 B1
(45) Date of Patent: Oct. 7, 2008

(54) AUTOMATIC GAIN CONTROL SYSTEM FOR MULTIPLE RECEIVING ANTENNAE

(75) Inventor: Po-Yuen Cheng, San Jose, CA (US)

(73) Assignee: Ralink Technology, Inc., Cupertino, CA (US)

( * ) Notice: Subject to any disclaimer, the term of this patent is extended or adjusted under 35 U.S.C. 154(b) by 502 days.

(21) Appl. No.: 11/139,343

(22) Filed: May 27, 2005

(51) Int. Cl.
H04B 1/06 (2006.01)
(52) U.S. Cl. ............... 455/250.1; 455/136; 455/234.1; 455/340; 375/345
(58) Field of Classification Search ........... 455/232.1, 455/234.1, 240.1, 132, 133, 136, 138, 239.1, 455/250.1, 134, 230, 334, 338–341; 375/345, 375/347
See application file for complete search history.

(56) References Cited

U.S. PATENT DOCUMENTS

| | | | |
|---|---|---|---|
| 5,703,910 A * | 12/1997 | Durvaux et al. | 375/322 |
| 6,075,823 A * | 6/2000 | Sonoda | 375/267 |
| 7,019,595 B1 | 3/2006 | Lo et al. | |
| 7,197,094 B2 | 3/2007 | Tung | |
| 7,245,677 B1 | 7/2007 | Pare, Jr. | |
| 7,248,650 B1 | 7/2007 | Tung et al. | |
| 7,266,146 B2 | 9/2007 | Pare, Jr. et al. | |
| 7,277,685 B2 * | 10/2007 | Liu et al. | 455/240.1 |
| 2003/0072397 A1 * | 4/2003 | Kim et al. | 375/347 |
| 2004/0224653 A1 * | 11/2004 | Kim | 455/136 |
| 2005/0146643 A1 * | 7/2005 | Lee | 348/678 |
| 2005/0213687 A1 * | 9/2005 | Matsui et al. | 375/316 |
| 2006/0198477 A1 * | 9/2006 | Moorti et al. | 375/347 |

* cited by examiner

*Primary Examiner*—Edward Urban
*Assistant Examiner*—Nhan Le
(74) *Attorney, Agent, or Firm*—Law Offices of Imam

(57) ABSTRACT

A multiple receiving antennae system having a plurality of radio frequency (RF) modules being responsive to incoming signals for processing the same to generate baseband signals. The multiple receiving antennae system further processes baseband signals to generate digital baseband signals, in accordance with an embodiment of the present invention. The multiple receiving antennae system further still includes a plurality of automatic gain control (AGC) modules being responsive to digital baseband signals for processing the same to generate a plurality of gain values. The plurality of gain values are used in the plurality of RF modules for independent gain adjustment of the incoming signals. The plurality of gain values are used to generate adjusted signals with enhanced signal to noise ratio (SNR) to improve the performance of the multiple receiving antennae system, whereby the plurality of gain values are used to enhance reception of incoming signals by improving SNR.

16 Claims, 3 Drawing Sheets

AUTOMATIC GAIN CONTROL SYSTEM FOR MULTIPLE RECEIVING ANTENNAE

BACKGROUND OF THE INVENTION

1. Field of the Invention

The present invention relates generally to the field of multiple receiving antennae systems and particularly to a method and apparatus for using automatic gain control (AGC) systems for adjusting the gain of the multiple receiving antennae systems.

2. Description of the Prior Art

As computers have gained enormous popularity in recent decades, so have networking the same allowing for access of files by one computer from another. More recently and with the advent of wireless communication, remote and wireless networking of computers is gaining more and more notoriety among personal users, small and large business owners, factory facilities and the like.

With regard to the wireless networking of personal computers including laptops, a particular modem, namely modems adapted to the IEEE 802.11a or 802.11g industry standard, are commonly employed. However, to improve reception of data at higher rates wireless receivers often employ multiple antennae. In the design of multiple receiving antennae systems new technical features and challenges arise. For example conventional 802.11g compliant receivers decode data modulated in both the time (complementary code keying (CCK)) and frequency domains (orthogonal frequency division multiplexing (OFDM)).

The gain of the multiple antennae needs to be adjusted to enhance reception of the incoming signals. In a conventional multiple receiving antennae system a single automatic gain control (AGC) module is used to generate the same gain for all the antennae therein. However, using the same gain may cause the incoming signals with more signal power to saturate the radio frequency (RF) systems while preventing the incoming signals with lower signal power from fully utilizing the dynamic range of the analog to digital converter (ADC) modules included in the multiple receiving antennae system. This is because the signal powers of the incoming signals for different antennae are in general different. In addition, different RF systems have in general different gain settings. Therefore, applying the same gain to different RF systems may degrade the performance of the multiple receiving antennae system.

In light of the foregoing, it is desirable to develop a method and apparatus for adjusting the gain of multiple receiving antennae systems while fully utilizing the dynamic range of the ADC modules included therein.

SUMMARY OF THE INVENTION

Briefly, an embodiment of the present invention includes a multiple receiving antennae system having a plurality of radio frequency (RF) modules being responsive to incoming signals for processing the same to generate baseband signals, said multiple receiving antennae system for processing said baseband signals to generate digital baseband signals. Said multiple receiving antennae system further includes a plurality of automatic gain control (AGC) modules being responsive to said digital baseband signals for processing the same to generate a plurality of gain levels, said plurality of gain levels being used in said plurality of RF modules for independent gain adjustment of said incoming signals, said plurality of gain levels being used to generate adjusted signals with enhanced signal to noise ratio (SNR) to improve the performance of said multiple receiving antennae system, wherein said plurality of gain levels being used to enhance reception of said incoming signals by improving SNR.

The foregoing and other objects, features and advantages of the present invention will be apparent from the following detailed description of the preferred embodiments which make reference to several figures of the drawing.

IN THE DRAWINGS

DETAILED DESCRIPTION OF THE PREFERRED EMBODIMENTS

Figure 1:
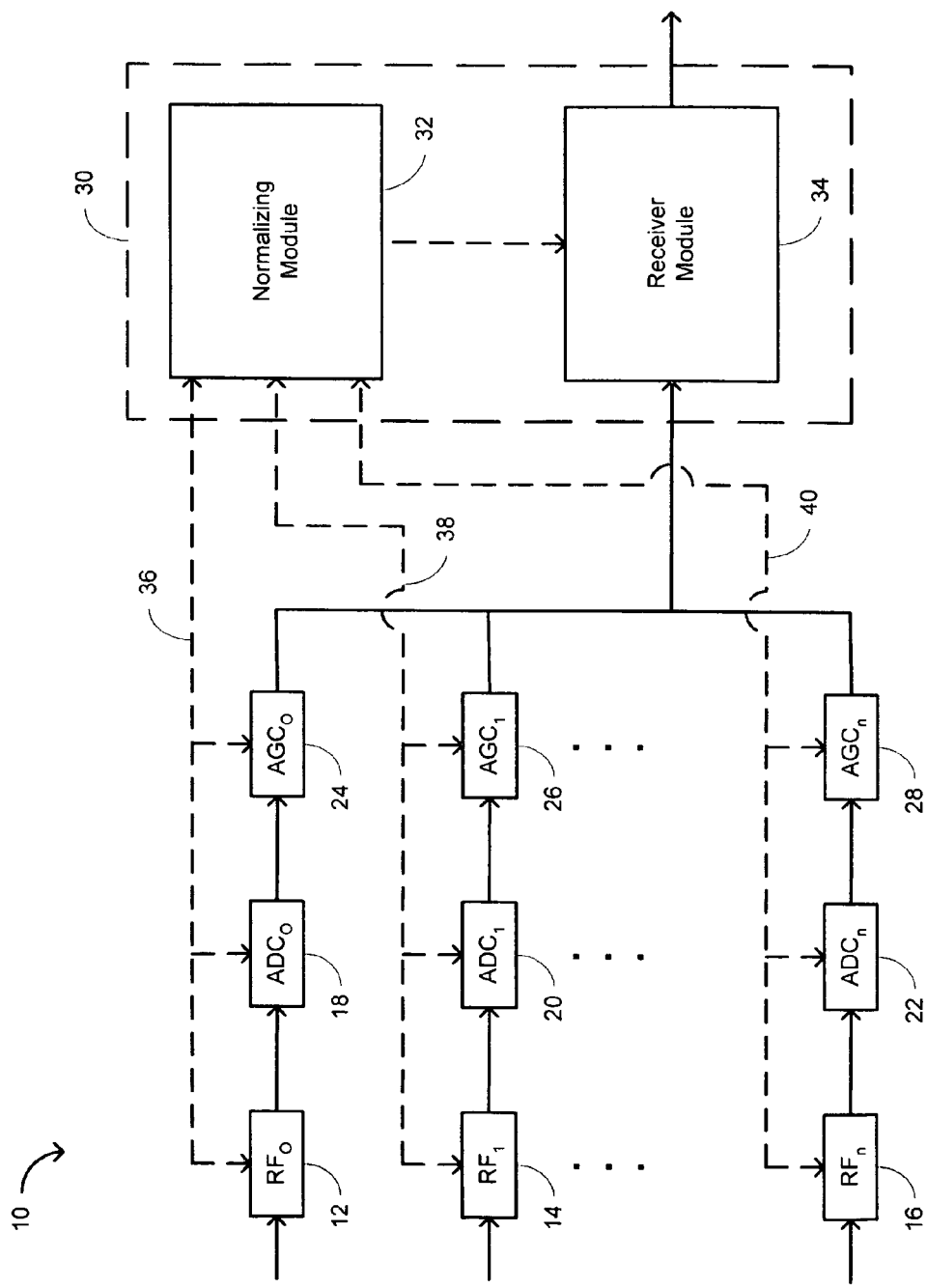
FIG. 1 shows the block diagram of a multiple receiving antennae system, in accordance with an embodiment of the present invention.

Referring now to FIG. 1, the block diagram of a multiple receiving antennae system 10 is shown to include a plurality of radio frequency (RF) modules 12-16, a plurality of analog to digital converter (ADC) modules 18-22, a plurality of automatic gain control (AGC) modules 24-28, and a weighting system 30, in accordance with an embodiment of the present invention. The weighting system 30 includes a normalizing module 32 and a receiving module 34.

The RF modules 12-16 are coupled to the ADC modules 18-22, respectively. The ADC modules 18-22 are coupled to the AGC modules 24-28 which are coupled to the normalizing module 32 and the receiving module 34. The normalizing module is coupled to the receiving module 34.

The input to the RF modules 12-16 comprises a plurality of incoming signals transferred thereto by a plurality of antennae (not shown in FIG. 1) that are coupled to the RF modules 12-16. The plurality of antennae receive signals generated through transmission of signals to the multiple receiving antennae system 10. The RF modules 12-16 process the incoming signals to generate baseband signals.

The gain level of the RF modules 12-16 needs to be adjusted to enhance reception of the incoming signals. In a conventional multiple receiving antennae system a single AGC module is used to generate the same gain level for all the antennae therein. However, using the same gain level may cause the incoming signals with higher signal energy to saturate the RF modules while preventing the incoming signals with lower signal energy from fully utilizing the dynamic range of the ADC modules included in the multiple receiving antennae system. This is because signal energies of the incoming signals for different antennae are in general different. In addition, different RF modules have in general different gain settings. Therefore, applying the same gain level to different RF modules may degrade the performance of the multiple receiving antennae system.

In the embodiment of the present invention shown in FIG. 1, independent AGC modules 24-28 are utilized to control the gain levels of the individual RF modules 12-16. Using independent gain control prevents the RF modules 12-16 from saturation while at the same time the dynamic range of each of the ADC modules 18-22 is fully utilized, as discussed in detail hereinbelow. The multiple receiving antennae system 10 may be used in any receiving system requiring gain control for multiple antennae such as multi input multi output modem systems.

The ADC modules 18-22 convert the baseband signals to digital baseband signals that are transferred to the AGC modules 24-28. The AGC modules 24-28 measure the energy of the respective incoming signals and based on the incoming signal energy determine independent gain levels. Control signals are generated and sent to the RF modules 12-16 wherein the incoming signals are adjusted by applying the independent gain levels thereto to generate adjusted signals. The adjusted signals included in the output of the AGC modules 24-28 are transferred to the receiving module 34.

Gain adjustment causes the adjusted signals to be approximately at the same level for all the antennae. However, the energy of the adjusted signals needs to be adjusted back to the levels existing prior to gain adjustment to improve the signal-to-noise ratio (SNR). This is because gain adjustment of the incoming signal with lower signal energy, having a lower SNR, amplifies the noise therein. Thus, the resulting adjusted signal needs to be attenuated to prevent SNR degradation. Additionally, utilizing the full range of the ADC modules 18-22 prevents the quantization error from dominating the incoming signals with lower energy. Accordingly, attenuating the adjusted signal to the level prior to gain adjustment improves the SNR thereof as compared to the SNR of the corresponding incoming signal.

Specifically, the AGC modules 24-28 determine the independent gain levels for the digital baseband signals. The gain levels are transferred to the normalizing module 32 via control signals 36-40. The normalizing module 32 uses the largest gain level to determine normalizing parameters for the digital baseband signals.

For example, if the gain levels transferred via control signals 36-40 are 50, 40 and 30 decibels (dB), respectively, the normalizing parameters are determined to be 1, 4/5, and 3/5, respectively, which are transferred to the receiving module 34. The receiving module 34 multiplies the adjusted signals generated by the AGC modules 24-28 with the normalizing parameters 1, 4/5, and 3/5, respectively, to attenuate the adjusted signals to the levels existing prior to gain adjustment. Thus, the output of the receiver module 34 comprises a plurality of normalized signals which are combined as discussed in detail in the U.S. patent application Ser. No. 11/048,075, entitled "JOINT TIME/FREQUENCY DOMAIN MAXIMUM RATIO COMBINNG ARCHITECTURES FOR MULTI INPUT MULTI OUTPUT WIRELESS RECEIVERS", filed on Jan. 31, 2005, the disclosure of which is herein incorporated by reference in its entirety.

Figure 2:
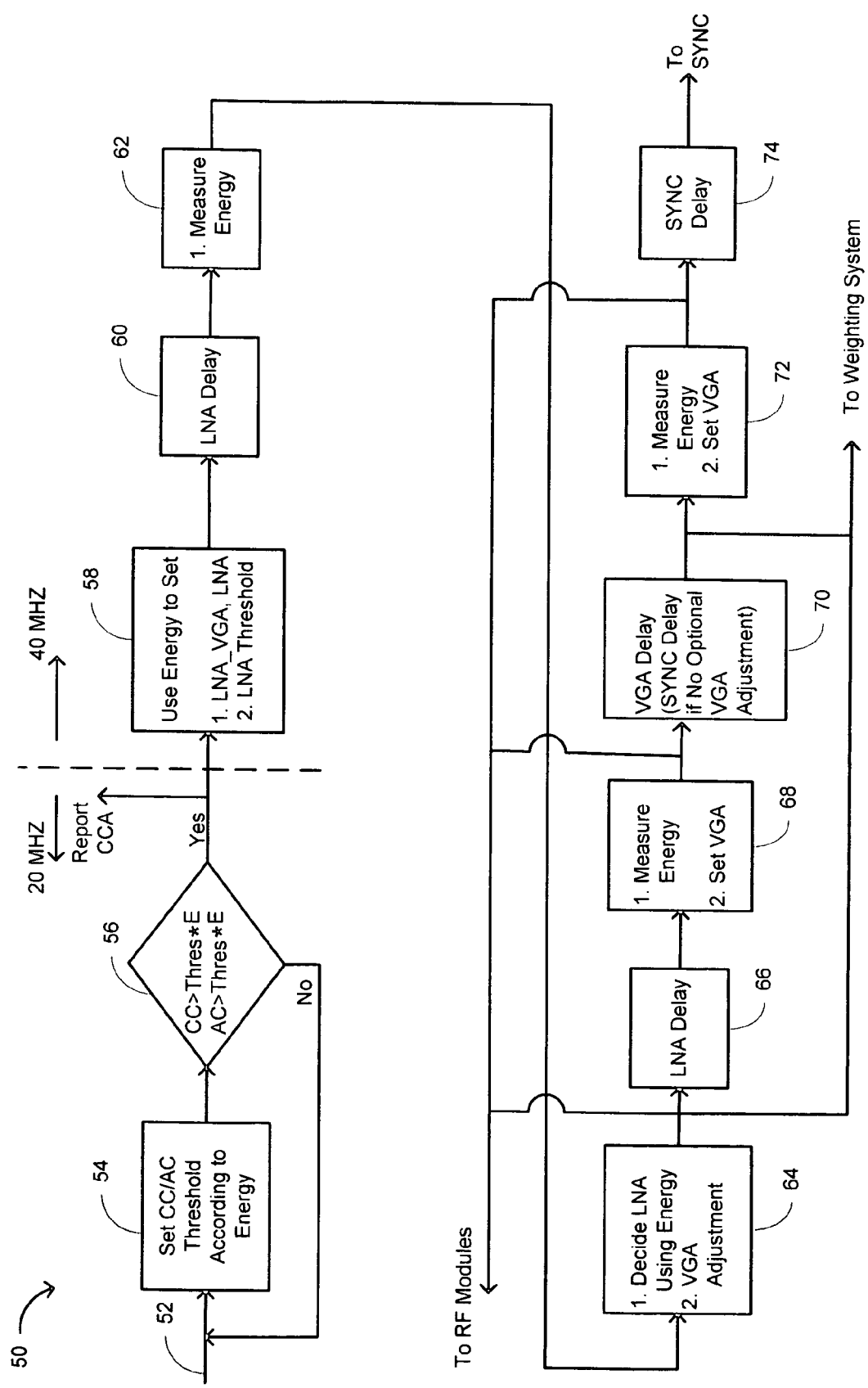
FIG. 2 shows the flowchart of an automatic gain control (AGC) module, in accordance with an embodiment of the present invention.

Referring now to FIG. 2, the flowchart 50 of an AGC module is shown, in accordance with an embodiment of the present invention. The digital baseband signals are included in the input to step 54 wherein cross correlation (CC) and auto-correlation (AC) thresholds are set according to the energy of the digital baseband signals. At the decision block 56 the adjusted baseband signal is detected by comparing the product of the energy of the signal and a threshold value (Thres) with auto-correlation and cross correlation thresholds, as described in detail hereinbelow. In cross correlation, the energy of the digital baseband signal is compared with the energy of a known preamble pattern while in auto-correlation it is the energy of the digital baseband signal that is being measured.

The energy of the digital baseband signal r(n), comprising 16 discrete values is determined as $$E = \sum_{n=0}^{15} TRUNC((\text{real } (r(n))^2 + \text{imag } (r(n))^2), 2).$$

The energy E is truncated (TRUNC) at 4 bits.

Conventionally, incoming signals are modulated in both time and frequency domains by employing complementary code keying (CCK) and orthogonal frequency division multiplexing (OFDM) modulation techniques, respectively. The cross correlation threshold for CCK modulated signals, denoted by $CC_{CCK}$, and the cross correlation threshold for OFDM modulated signals, denoted by $CC_{OFDM}$, are determined according to $$C_{CCK} = \sum_{n=0}^{15} r(n) \times S'_{CCK}(n) \quad C_{OFDM} = \sum_{n=0}^{15} r(n) \times S'_{OFDM}(n)$$

$$CC_{OFDM} = C_{OFDM} \times C_{OFDM}$$

$$CC_{CCK} = C_{CCK} \times C_{CCK}$$

$$S_{OFDM} = [2+2j-8-1-4j8-j-1-4j-8\ 2+2j-8j-4-j-1+ 8j4j-1+8j-4-j-8j]$$

$$S_{CCK} = [4, 0, -4, -1, 4, 4, 0, -4, -1, 4, 4, 4, 4, 4, -1, -4],$$

wherein prime denotes complex conjugation.

The auto-correlation threshold for CCK modulated signals, denoted by $AC_{CCK}$, and the auto-correlation threshold for OFDM modulated signals, denoted by $AC_{OFDM}$, are determined according to $$A_{OFDM} = \sum_{n=0}^{15} r(n) \times r'(n-16)$$

$$AC_{OFDM} = |\text{real}(A_{OFDM})| \times |\text{imag}(A'_{OFDM})|$$

$$A_{CCK} = \sum_{n=0}^{15} r(n) \times r'(n-20)$$

$$AC_{CCK} = |\text{real}(A_{CCK})| \times |\text{imag}(A'_{CCK})|.$$

The ADC modules 18-22 generate CCK and OFDM-modulated digital baseband signals. At the decision block 56 a CCK-modulated digital baseband signal is detected when $CC_{CCK}$ and $AC_{CCK}$ are greater than or equal to a threshold value (Thres) multiplied by the energy E, i.e., $$CC_{CCK} \geq \text{Thres} \times E,$$

and $$AC_{CCK} = \text{Thres} \times E.$$

Similarly, an OFDM-modulated adjusted baseband signal is detected when $$CC_{OFDM} \geq \text{Thres} \times E,$$

and $$AC_{OFDM} \geq Thres \times E.$$

The threshold value (Thres) is a predetermined value which may be programmed into the multiple receiving antennae system 10.

Upon detecting a digital baseband signal further processing would determine the gain levels, as described hereinbelow. Detection of a digital baseband signal causes a Report Clear Channel Assessment (Report CCA) signal to be generated. If no signal is detected the foregoing process is repeated for the subsequent digital baseband signals.

Gain adjustment is performed at two different levels. The first level consists of low noise amplifier (LNA) which is a coarse adjustment and the second level consists of variable gain amplifier (VGA) which is a fine adjustment. Combination of LNA and VGA levels determines the gain level which is transferred to one of the RF modules 18-22.

The total dynamic range of the incoming signal strength is divided into a plurality of sub-ranges for LNA adjustment. Typically, the dynamic range extends from −90 millidecibels (dBm) to −10 dBm. In the embodiment shown in FIG. 2, the dynamic range is divided into 3 sub-ranges: LNA-Low, LNA-Medium, and LNA-High denoted by L, M and H, respectively. In another embodiment of the present invention, a different number of sub-ranges may be used.

Each of the sub-ranges L, M, and H includes two LNA thresholds so that a total of six LNA thresholds are used in the dynamic range of the incoming signal strength in the present invention. The strength or power of the incoming signal determines the sub-range to which the signal belongs with the two LNA thresholds corresponding thereto. The LNA thresholds are set at step 58. Also set at step 58 are the LNA and LNA_VGA values, which are determined according to the RF characteristics of the multiple receiving antennae system 10. The LNA thresholds are determined at step 58 using the energy of the adjusted baseband signal. By contrast, in conventional multiple receiving antennae systems the same LNA threshold is used for the entire dynamic range.

At step 60, the data measurement process is delayed depending on the number of microseconds (μsec) needed for the delay. At step 62, the energy of the digital baseband signal is measured again for utilization in subsequent steps.

At step 64, the energy of the signal is used to locate the sub-range for the LNA adjustment. Specifically, the LNA level is determined to be in the low, medium, or high sub-range by using the LNA thresholds determined at step 58. Subsequently, VGA adjustment is performed on the signal to determine a VGA level. The VGA level is determined using the VGA equation given according to $$VGA\_LEVEL = VGA\_LEVEL - SATUR(ROUND(VGA\_COEFF*(\log 2\ Desired\_level - \log 2\ ENERGY), 5,7)). \quad (1)$$

In equation (1) VGA_COEFF is a parameter specific to the RF module design which may be programmed into the multiple receiving antennae system 10. Saturation (SATUR) is performed at 7 bits while rounding (ROUND) is performed to 5 bits. Desired_level in equation (1) is the level the energy (ENERGY) of the digital baseband signal is expected to reach for gain adjustment. If the Desired_level is not achieved equation (1) is used again, as described hereinbelow.

At step 66, data measurement process is delayed for pre-assigned amount of time for VGA adjustment to be performed. At step 68, energy of the digital baseband signal is measured and used in equation (1) to determine the VGA level for a second time. At step 70, data measurement process is delayed for a pre-determined amount of time if further VGA adjustment needs to be performed, i.e., if the Desired_level of energy is not reached. Under such circumstances, energy of the digital baseband signal is measured and used in equation (1) to determine the VGA level one more time.

At step 74, characterized by synchronization (SYNC) delay, the data processing is delayed for synchronization. One of the reasons for the SYNC delay is the time lapse between completion of the VGA adjustment process in the AGC modules 24-28 and the receipt of the control signals by the RF modules 12-16. Accordingly, the SYNC delay compensates for the time lag between the baseband (BB), i.e. the AGC modules, and the RF portions of the multiple receiving antennae module 10.

However, if the Desired_level of energy is reached at step 68, then step 70 is characterized by a SYNC delay and no further VGA adjustment is performed beyond step 70.

At the completion of each VGA adjustment, i.e. after steps 64, 68 and 72, control signals are generated and transferred to the RF modules 12-16 for gain adjustment. In addition, the gain levels are generated by combining the LNA and VGA levels and transferred to the normalizing module 32 at the completion of steps 64 and 70. Data comprising adjusted signals is transferred to the receiver module 34 at the completion of step 74.

Figure 3:
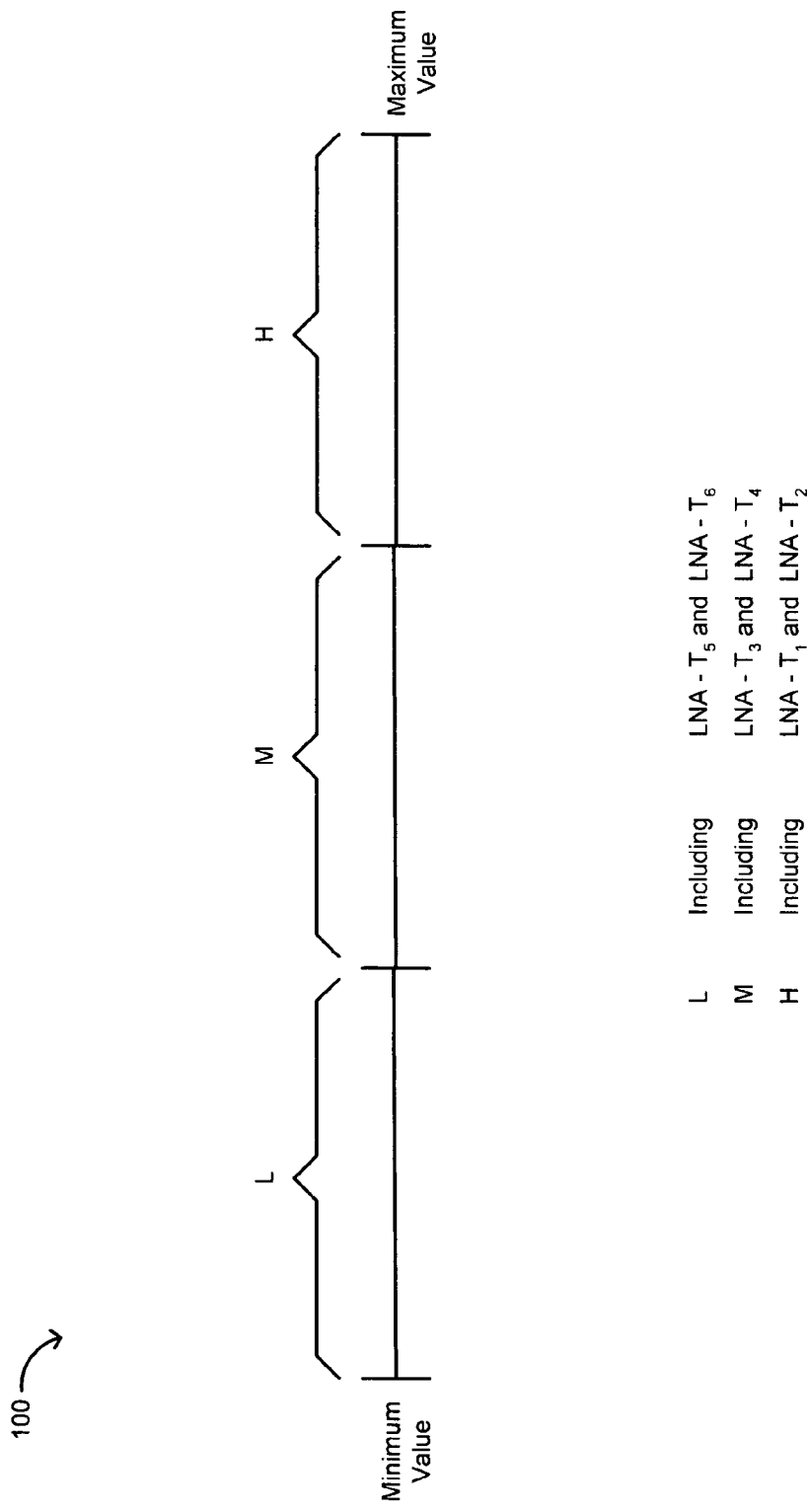
FIG. 3 shows the dynamic range of the incoming signal strength, in accordance with an embodiment of the present invention.

Referring now to FIG. 3, the dynamic range 100 of the incoming signal strength is shown to include a minimum value, a maximum value and three sub-ranges L, M and H, in accordance with an embodiment of the present invention. The dynamic range 100 represents a dBm scale wherein the strength or power of the incoming signal is expected to be located. In the embodiment of the present invention shown in FIG. 3, the minimum and maximum values correspond to signal strengths of −90 and −10 dBm, respectively. The two LNA thresholds of the sub-range H are LNA-$T_1$ and LNA-$T_2$, the LNA thresholds of the sub-range M are LNA-$T_3$ and LNA-$T_4$, and the LNA thresholds of the sub-range L are LNA-$T_5$ and LNA-$T_6$.

The incoming signal strength is expected to be located in the dynamic range 100. The extent of sub-ranges L, M and H depends on the RF properties of the RF modules 12-16 which may be programmed into the multiple receiving antennae system 10.

For example, if design characteristics of an RF module in system 10 indicate the LNA level for the M sub-range to be 10 dB and the VGA measurement to be 0.5 dB then the signal strength is determined by adding the LNA level (10 dB) and the VGA level multiplied by 0.5 dB. Therefore, if the LNA level of a signal is measured to be in the M sub-range with a VGA level of 40, the gain level for the incoming signal is determined to be Adjusted signal strength=*LNA* level+*VGA\*VGA* level=10+0.5\*40=30 dB.

The present invention improves the performance of multiple receiving antennae systems by providing independent AGC modules 24-28 to fully utilize the dynamic range of the ADC modules 18-22 and enhance the SNR. The improvement in SNR is estimated to be in the range of 1.5-3.0 dB.

The multiple receiving antennae system 10 shown in FIG. 1, includes a processor (not shown), or computer medium, some type of storage area and a computer readable medium, for storing the software/firmware described in FIG. 1. The processor executes codes from the computer readable medium for effectuating the functions outlined in FIG. 1.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A multiple receiving antennae system for receiving signals comprising:
   a plurality of radio frequency (RF) modules being responsive to incoming signals for processing the same to generate baseband signals, said multiple receiving antennae system for processing said baseband signals to generate digital baseband signals,
   a plurality of automatic gain control (AGC) modules being responsive to said digital baseband signals for processing the same to generate a plurality of gain values, said plurality of gain values being used in said plurality of RF modules for independent gain adjustment of said incoming signals, said plurality of gain values being used to generate adjusted signals with enhanced signal to noise ratio (SNR) to improve the performance of said multiple receiving antennae system, wherein said plurality of gain values being used to enhance reception of said incoming signals by improving SNR,
   a plurality of analog to digital converter (ADC) modules being responsive to said baseband signals for processing the same to generate said digital baseband signals, each of said plurality of ADC modules for having a dynamic range for including a minimum decibel (dBm) value and a maximum decibel value, and a weighting system for including a normalizing module and a receiving module, said normalizing module being responsive to said plurality of gain values for processing the same to generate normalizing parameters, said plurality of automatic gain control (AGC) modules generating control signals and transferring said control signals to said normalizing module and said plurality of radio frequency (RF) modules.

2. A multiple receiving antennae system as recited in claim 1 wherein said receiving module being responsive to said adjusted signals and said normalizing parameters to generate normalized signals, said normalizing parameters for improving signal to noise ratio (SNR) to enhance the performance of said multiple receiving antennae system.

3. A multiple receiving antennae system as recited in claim 2 wherein said plurality of automatic gain control (AGC) modules for causing full utilization of said dynamic ranges of said plurality of analog to digital converter (ADC) modules to prevent the quantization error from dominating said incoming signals.

4. A multiple receiving antennae system as recited in claim 1 wherein said digital baseband signal including 16 discrete values denoted by r(n), the energy E of said digital baseband signal being determined according to $$E = \sum_{n=0}^{15} TRUNC((\text{real } (r(n))^2 + \text{imag } (r(n))^2), 2).$$

5. A multiple receiving antennae system as recited in claim 4 wherein said incoming signals including complementary code keying (CCK) modulated and orthogonal frequency division multiplexing (OFDM) modulated signals, said plurality of automatic gain control (AGC) modules determining cross correlation threshold for said CCK modulated signals according to $$C_{CCK} = \sum_{n=0}^{15} r(n) \times S'_{CCK}(n)$$

$$CC_{OFDM} = C_{OFDM} \times C_{OFDM}$$

$S_{CCK} = [4, 0, -4, -1, 4, 4, 0, -4, -1, 4, 4, 4, 4, 4, -1, -4]$, said plurality of AGC modules determining cross correlation thresholds for said OFDM modulated signals according to $$C_{OFDM} = \sum_{n=0}^{15} r(n) \times S'_{OFDM}(n)$$

$$CC_{OFDM} = C_{OFDM} \times C_{OFDM}$$

$S_{OFDM} = [2+2j-8-1-4j8-j-1-4j-82+2j-8j-4-j-1+8j4j-1+8j-4-j-8j]$.

6. A multiple receiving antennae system as recited in claim 5 wherein said plurality of automatic gain control (AGC) modules determining auto-correlation threshold for said complementary code keying (CCK) modulated signals according to $$A_{CCK} = \sum_{n=0}^{15} r(n) \times r'(n-20)$$

$AC_{CCK} = |\text{real}(A_{CCK}) \times |\text{imag}(A'_{CCK})|$, said plurality of AGC modules determining auto-correlation threshold for said orthogonal frequency division multiplexing (OFDM) modulated signals according to $$A_{OFDM} = \sum_{n=0}^{15} r(n) \times r'(n-16)$$

$AC_{OFDM} = |\text{real}(A_{OFDM}) \times |\text{imag}(A'_{OFDM})|$.

7. A multiple receiving antennae system as recited in claim 6 wherein said plurality of analog to digital converter (ADC) modules generating complementary code keying (CCK) and orthogonal frequency division multiplexing (OFDM) modulated digital baseband signals, said multiple receiving antennae system for using a threshold value (Thres) to detect said CCK modulated digital baseband signal by satisfying the relations given according to $CC_{CCK} \geq \text{Thres} \times E$, and $AC_{CCK} \geq \text{Thres} \times E$.

8. A multiple receiving antennae system as recited in claim 7 detecting said orthogonal frequency division multiplexing (OFDM) modulated digital baseband signal by satisfying the relations given according to $$CC_{OFDM} \geq Thres \times E,$$

and $$AC_{OFDM} \geq Thres \times E.$$

9. A multiple receiving antennae system as recited in claim 4 each of said plurality of gain values being determined by combining a low noise amplifier (LNA) level with a variable gain amplifier (VGA) level, said LNA level being adjusted using said dynamic ranges of said plurality of analog to digital converter (ADC) modules.

10. A multiple receiving antennae system as recited in claim 9 wherein said dynamic range being divided into three sub-ranges, each of said sub-ranges including two low noise amplifier (LNA) thresholds being determined using said energy of said digital baseband signal, said multiple receiving antennae system for using said energy to locate said LNA level in one of said sub-ranges.

11. A multiple receiving antennae system as recited in claim 10 wherein said variable gain amplifier (VGA) level being determined using said energy of said digital baseband signal, a VGA_COEFF parameter and a Desired_level, said VGA_COEFF being a programmable parameter depending on the design characteristics of said plurality of radio frequency (RF) modules, said Desired_level being a level of energy for comparing said energy of said digital baseband signal thereto, a VGA equation being used to determine a first VGA level according to $$VGA\_LEVEL = VGA\_LEVEL - SATUR(ROUND(VGA\_COEFF*(\log 2\ Desired\_level - \log 2\ ENERGY), 5,7).$$

12. A multiple receiving antennae system as recited in claim 11 wherein said first variable gain amplifier (VGA) level being used in said VGA equation to determine a second VGA level for fine tuning the VGA level adjustment.

13. A multiple receiving antennae system as recited in claim 12 for combining said first variable gain amplifier (VGA) level with said low noise amplifier (LNA) level to generate said plurality of gain values, said plurality of gain valued being transferred to said normalizing module and said plurality of radio frequency (RF) modules using said control signals.

14. A multiple receiving antennae system as recited in claim 13 for combining said second variable gain amplifier (VGA) level with said low noise amplifier (LNA) level to generate said plurality of gain values, said plurality of gain valued being transferred to said normalizing module and said plurality of radio frequency (RF) modules using said control signals.

15. A multiple receiving antennae system as recited in claim 14 for delaying said plurality of gain values for synchronization (SYNC) to compensate for the time lag between the completion of variable gain adjustment (VGA) process and the receipt of said control signals by said plurality of radio frequency (RF) modules.

16. A multiple receiving antennae system as recited in claim 12 wherein said second variable gain amplifier (VGA) level being used in said VGA equation to determine a third VGA level for fine tuning the VGA level adjustment.

* * * * *